United States Patent
Jones et al.

(10) Patent No.: US 10,508,821 B2
(45) Date of Patent: Dec. 17, 2019

(54) HUMIDIFICATION SYSTEM

(71) Applicant: Corrigan Corporation of America, Gurnee, IL (US)

(72) Inventors: Paul Jones, Ingleside, IL (US); J. Michael Corrigan, Grayslake, IL (US); Eric Ellingson, Libertyville, IL (US)

(73) Assignee: Corrigan Corporation of America, Gurnee, IL (US)

( * ) Notice: Subject to any disclaimer, the term of this patent is extended or adjusted under 35 U.S.C. 154(b) by 0 days.

(21) Appl. No.: 15/946,906

(22) Filed: Apr. 6, 2018

(65) Prior Publication Data
US 2018/0224138 A1  Aug. 9, 2018

Related U.S. Application Data

(62) Division of application No. 15/248,444, filed on Aug. 26, 2016.

(51) Int. Cl.
F24F 6/14 (2006.01)

(52) U.S. Cl.
CPC .......... *F24F 6/14* (2013.01); *F24F 2006/143* (2013.01); *Y02B 30/545* (2013.01)

(58) Field of Classification Search
CPC ... B01F 3/04063; F24F 2006/143; F24F 6/14; Y02B 30/545
See application file for complete search history.

(56) References Cited

U.S. PATENT DOCUMENTS

| | | | | |
|---|---|---|---|---|
| 1,761,422 A * | 6/1930 | Wagner | ............ | B05B 1/265 239/512 |
| 2,032,404 A * | 3/1936 | Fisher | ............ | F24F 6/12 261/116 |
| 2,625,806 A * | 1/1953 | Kennedy | ............ | A47F 3/0495 62/247 |
| 3,790,079 A * | 2/1974 | Berglund | ............ | B05B 17/0607 239/3 |
| 3,990,427 A * | 11/1976 | Clinebell | ............ | F24F 6/12 126/113 |
| 4,179,900 A * | 12/1979 | Corrigan | ............ | A47F 3/0495 239/11 |
| 4,190,875 A * | 2/1980 | Smart | ............ | B03C 3/16 239/706 |

(Continued)

FOREIGN PATENT DOCUMENTS

FR  2787352 A1 *  6/2000  ......... B05B 17/0607

OTHER PUBLICATIONS

"Housing" The Free Dictionary accessed at <https://web.archive.org/web/20130125065023/https://www.thefreedictionary.com/housing> published Jan. 25, 2013 (Year: 2013).*

(Continued)

*Primary Examiner* — Stephen Hobson
(74) *Attorney, Agent, or Firm* — Wood, Phillips, Katz, Clark & Mortimer

(57) ABSTRACT

A dry fog diffuser comprises a support. A shroud is mounted to the support. The shroud comprises a tubular elbow having an inlet end and an outlet end. The shroud is mounted with a long side of the elbow including a drain port facing downward. An atomizing nozzle is mounted at the inlet end of the elbow and aligned with an axis of the elbow at the inlet end. The nozzle is connected, in use, to a water supply and an air supply. The diffuser produces a dry fog exiting shroud at the outlet end of the tubular elbow.

13 Claims, 6 Drawing Sheets

(56) References Cited

U.S. PATENT DOCUMENTS

| | | | | |
|---|---|---|---|---|
| 4,678,125 A * | 7/1987 | Elston | B05B 7/0884 | 239/433 |
| 4,738,806 A * | 4/1988 | Noma | A47F 3/0495 | 261/81 |
| 4,808,303 A * | 2/1989 | Edwards | A47F 3/0495 | 210/138 |
| 5,193,354 A * | 3/1993 | Kleinberger | A47F 3/001 | 239/338 |
| 5,762,661 A * | 6/1998 | Kleinberger | A47F 3/001 | 261/116 |
| 5,893,520 A * | 4/1999 | Elkas | B05B 1/00 | 239/499 |
| 5,961,047 A * | 10/1999 | Kleinberger | B05B 7/262 | 239/124 |
| 6,132,497 A * | 10/2000 | Conklin | B01D 47/06 | 95/223 |
| 6,651,901 B2 * | 11/2003 | Jones | B05B 1/3026 | 239/99 |
| 8,128,069 B2 * | 3/2012 | Reens | F24F 6/12 | 261/116 |
| 8,430,379 B2 * | 4/2013 | Goldstein | B08B 17/00 | 239/428.5 |
| 9,138,761 B2 * | 9/2015 | Ritchie | F24F 5/0035 | |
| 9,815,557 B2 * | 11/2017 | Nelson | B64D 13/06 | |
| 2005/0011372 A1 * | 1/2005 | Corrigan | A23L 3/3445 | 99/468 |
| 2009/0293357 A1 * | 12/2009 | Vickers | A01G 31/02 | 47/62 A |
| 2017/0203323 A1 * | 7/2017 | Gschwind | A47F 3/001 | |

OTHER PUBLICATIONS

"Pressure regulator" Wikipedia published Mar. 9, 2015 accessed at <https://en.wikipedia.org/w/index.php?title=Pressure_regulator&oldid=650609908> (Year: 2015).*

EPO translation of FR 2787352 published Jun. 23, 2000 (Year: 2000).*

* cited by examiner

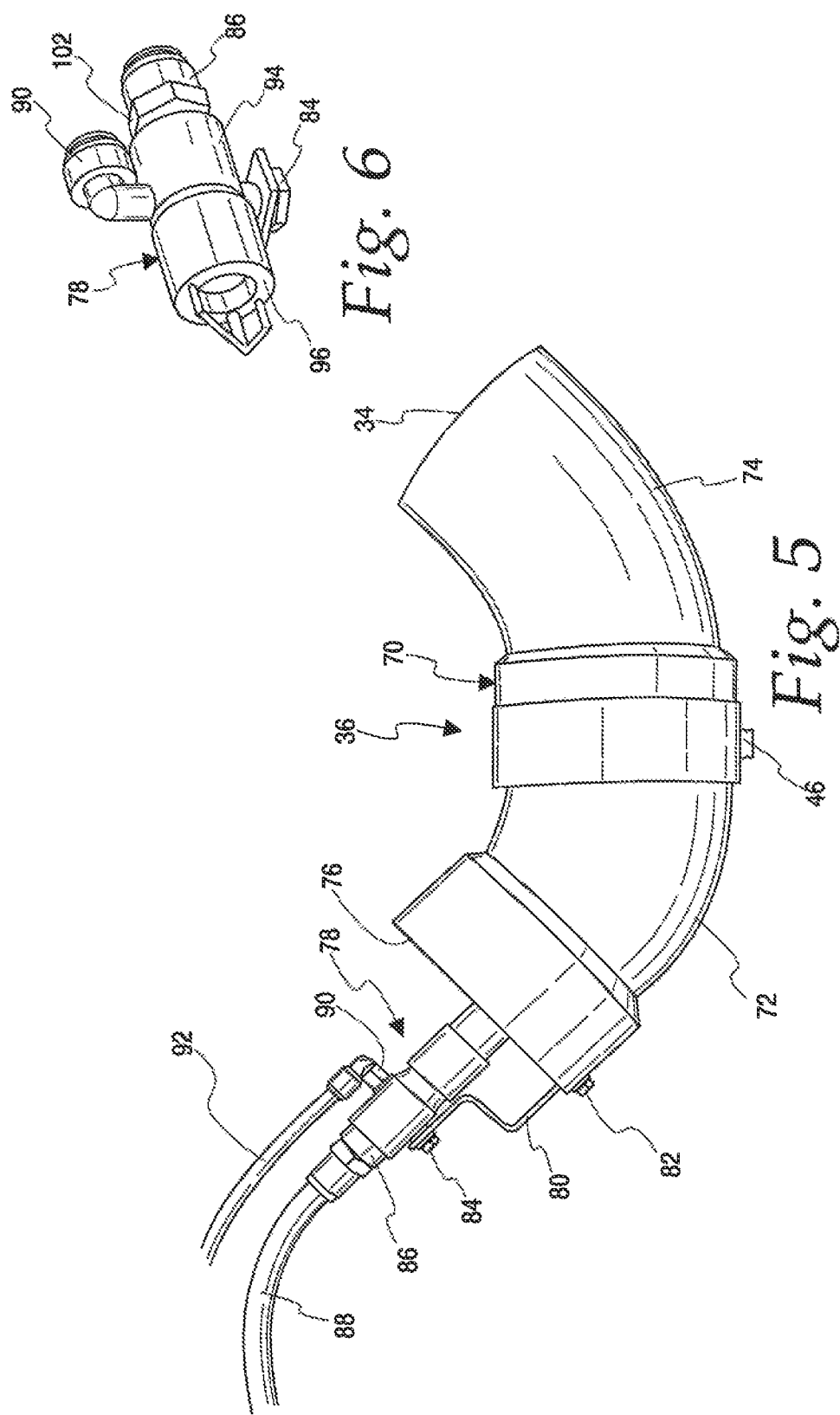

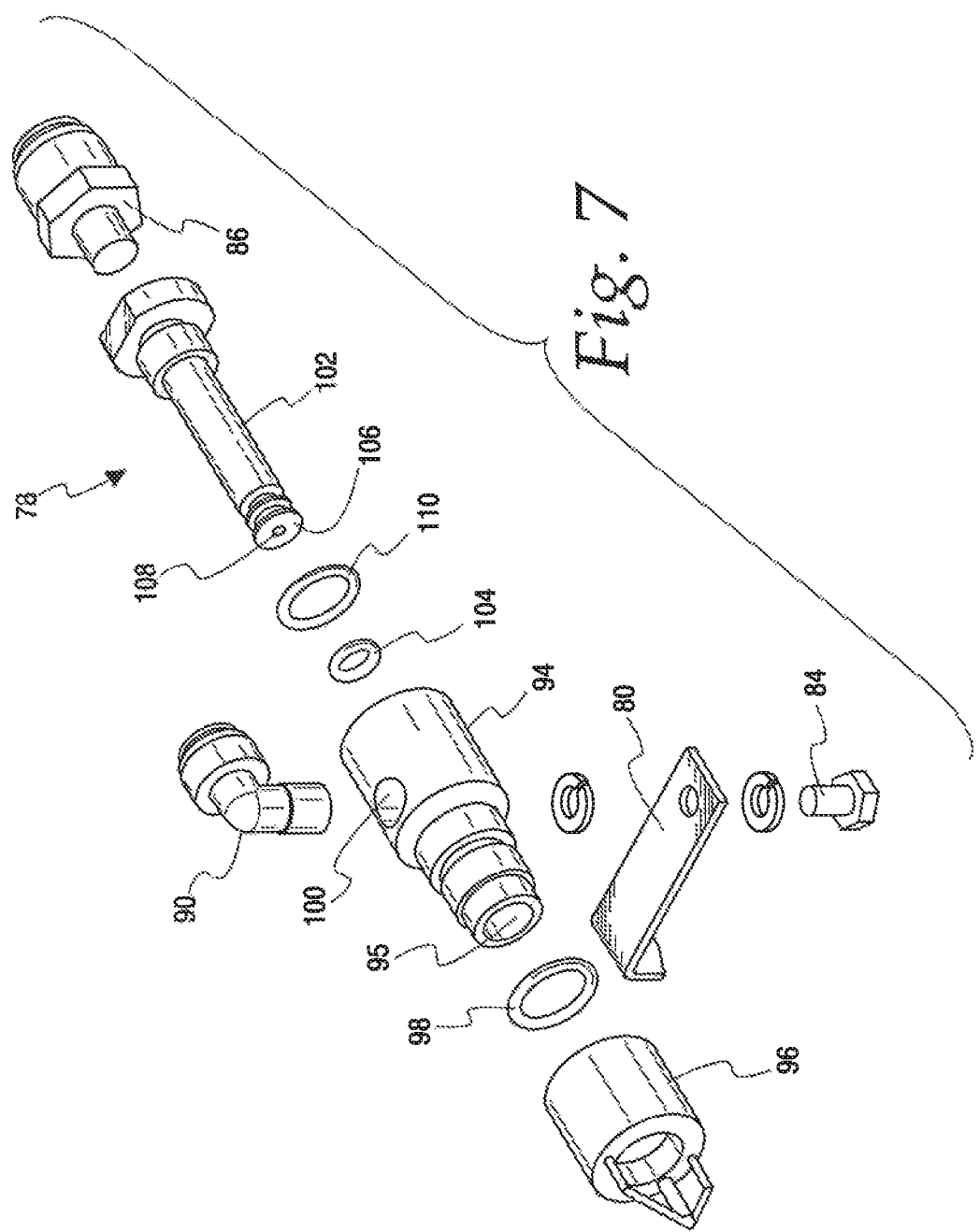

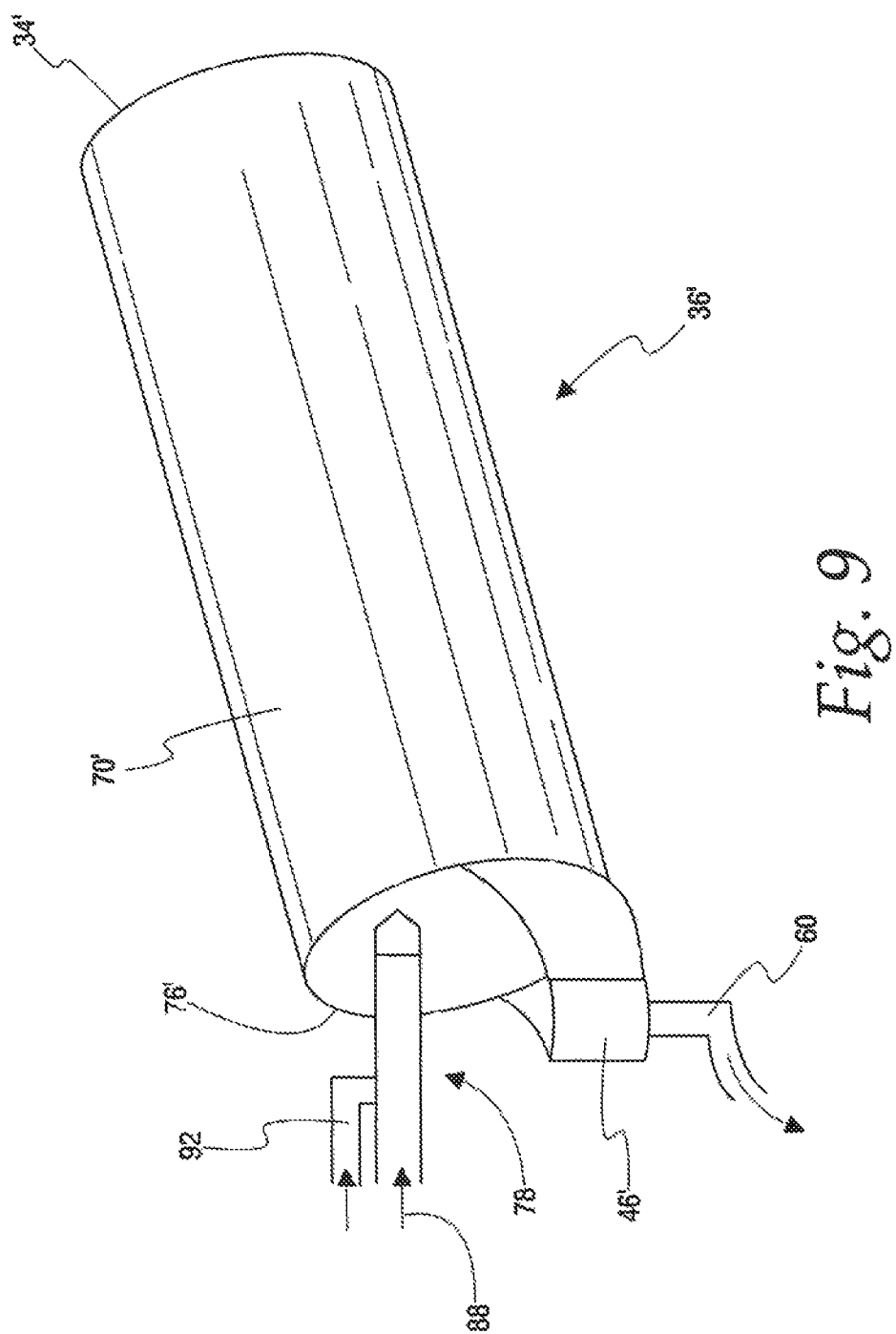

HUMIDIFICATION SYSTEM

CROSS-REFERENCE TO RELATED APPLICATIONS

This application is a divisional of application Ser. No. 15/248,444 filed Aug. 26, 2016.

FIELD OF THE INVENTION

This application relates to humidification systems and, more particularly, to a humidification system including a dry fog diffuser.

BACKGROUND OF THE INVENTION

Various enclosed spaces benefit from the control of humidity levels. Some spaces, such as warehouses and cold rooms, may require that humidity be added to the space. Applications for humidification systems include, for example, perishable warehouses and distribution centers, banana ripening and fruit de-greening rooms, greenhouses, wine and barrel storage rooms, cigar rooms, and mushroom farms. More generally, humidification systems find utility in any situation that requires precise humidity.

With any humidification system it is important to maintain a desired humidity level, while avoiding excess humidity. Also, it is advantageous that the humidification system minimizes the generation of large particles of water which might collect on structures in the area as well as the goods being stored. As such, it is desirable that a humidification system maintain a high humidity environment, without dripping and dampness on walls, racking, and floors.

This application describes improvements in humidification systems.

SUMMARY OF THE INVENTION

As described herein, a humidification system uses a dry fog diffuser.

In one aspect of the invention, a dry fog diffuser comprises a support. A shroud is mounted to the support. The shroud comprises a tube having an inlet end and an outlet end. The shroud is mounted with a lower side of the tube including a drain port facing downward. An atomizing nozzle is mounted at the inlet end of the tube and aligned with an axis of the tube at the inlet end. The nozzle is connected, in use, to a water supply and an air supply. The diffuser produces a dry fog exiting the shroud at the outlet end of the tube.

It is a feature that the outlet end is at about a 45-degree angle relative to a horizontal plane. It is another feature that the outlet end and the inlet end are at about a 45-degree angle relative to a horizontal plane.

It is another feature that the tube comprises a 90-degree elbow and may be formed from two 45-degree elbows connected together.

It is an additional feature that a housing encloses the tubular elbow and the nozzle has an opening receiving the outlet end of the tubular elbow. An air pressure regulator and pressure gauge may be mounted on the housing and operatively connected between the atomizing nozzle and an air inlet adapter for connection to the air supply. A water pressure regulator and pressure gauge may be mounted on the housing and operatively connected between the atomizing nozzle and a water inlet adapter for connection to the water supply.

It is yet another feature that the tube has a diameter in a range of 1-6 inches. The tube may have a diameter of about 4 inches.

It is a further feature that the diffuser generates a dry fog having a particle size averaging about ten microns.

It is still another feature that the atomizing nozzle is aligned parallel with the axis of the elbow at the inlet end.

There is disclosed in accordance with another aspect that the invention a dry fog humidification system comprising a controllable water valve connected between a water supply and a water header. A compressor selectively supplies air to an air header. A control selectively operates the compressor and the water valve. A plurality of diffusers are provided. Each diffuser comprises a housing and a shroud mounted in the housing. The shroud comprises a tube having an inlet end and an outlet end. The shroud is mounted with a lower side of the tube including a drain port facing downward and extending through an opening in a bottom wall of the housing. An atomizing nozzle is mounted at the inlet end of the tube and aligned with an axis of the elbow at the inlet end. The nozzle is connected via a water inlet adapter to the water header and via an air inlet adapter to the air header. Each diffuser produces a dry fog exiting the shroud at the outlet end of the tubular elbow.

Further features and advantages will be readily apparent from the specification and from the drawings.

BRIEF DESCRIPTION OF THE DRAWINGS

FIG. 5 is a side view of the shroud and atomizing nozzle of the dry fog diffuser shown without the housing;

FIG. 6 is a perspective view of the atomizing nozzle;

FIG. 7 is an exploded view of the atomizing nozzle;

FIG. 9 is a perspective view of an alternative shroud comprising a straight tube.

DETAILED DESCRIPTION

The disclosed humidification system uses a dry fog diffuser to maintain humidity at desired levels.

Figure 1:
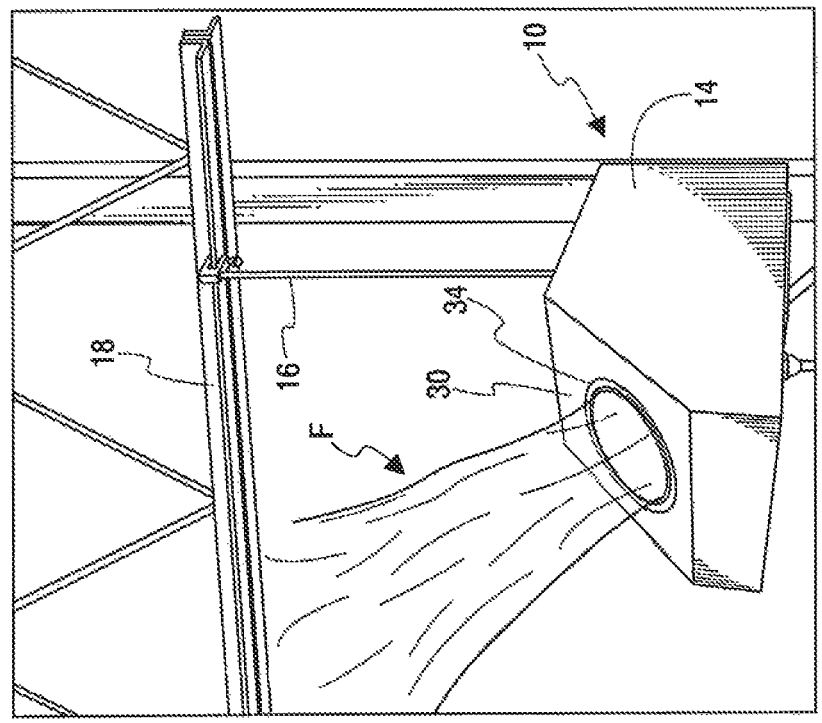
FIG. 1 is a perspective view of a dry fog diffuser shown producing a dry fog.
Figure 8:
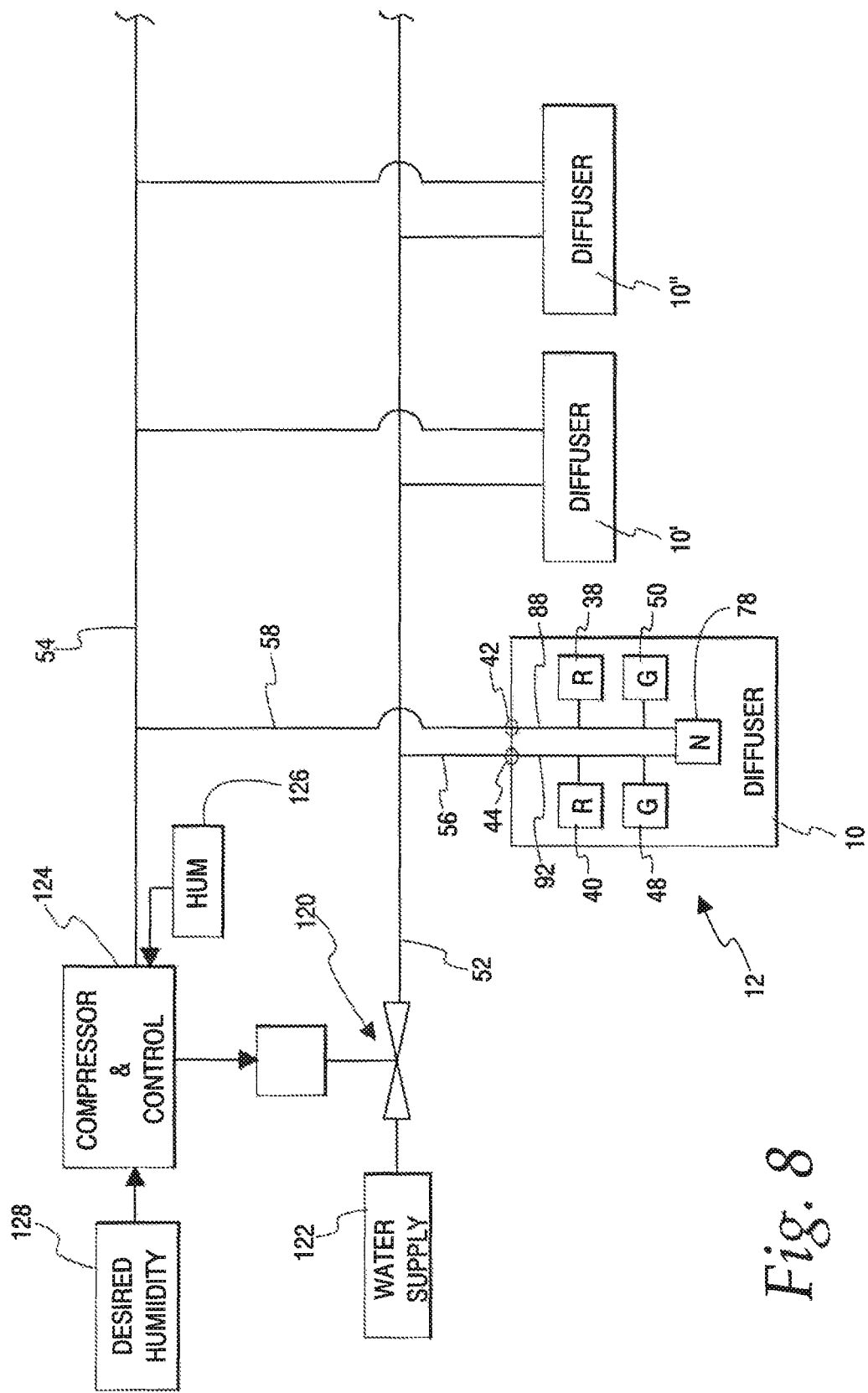
FIG. 8 is a schematic/block diagram of a humidification system using the dry fog diffuser.

Referring initially to FIG. 1, a dry fog diffuser 10 is illustrated for use in a humidification system 12, see FIG. 8. The diffuser 10 is adapted to provide a dry fog having a particle size averaging about 10 microns to maintain a high humidity environment, without the dripping and dampness on walls, racking, and floors, and the like.

The diffuser 10 includes a housing 14 shown suspended via a hanger 16 from a roof truss 18. As will be appreciated, the diffuser 10 may be mounted at any desired location within the humidified space.

Figure 2:
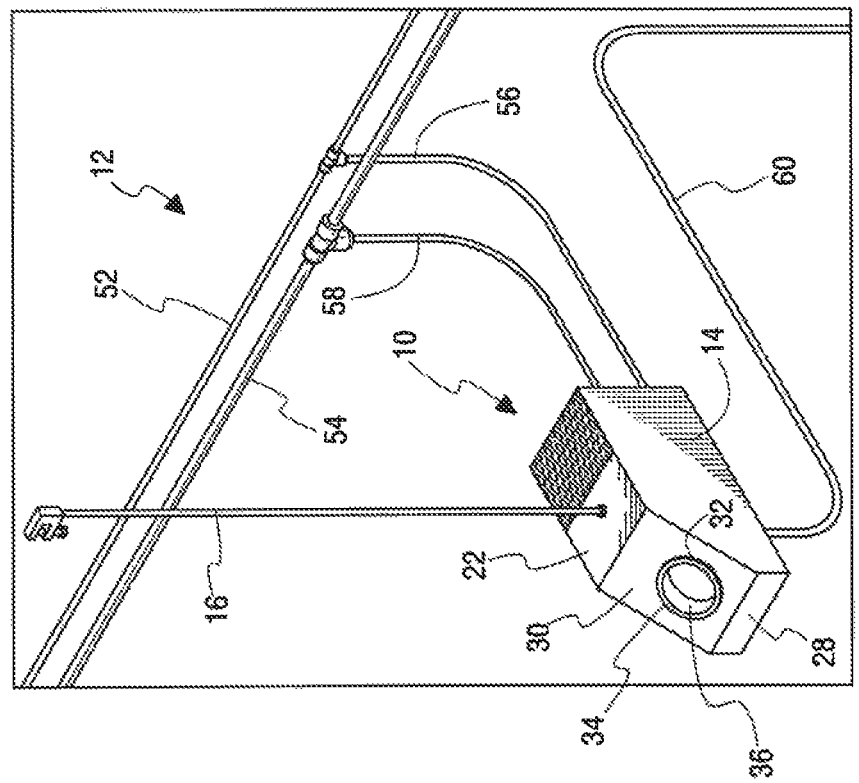
FIG. 2 is top front perspective view of the dry fog diffuser showing connections to supply lines.
Figure 4:
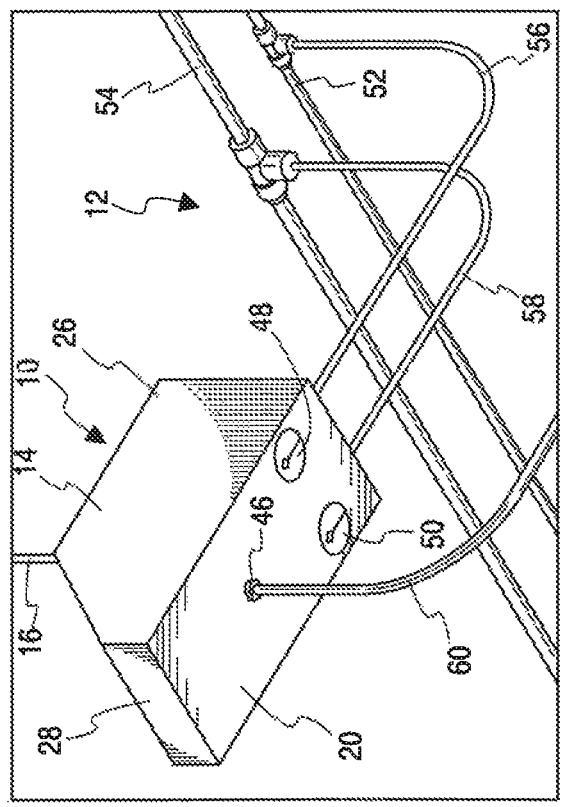
FIG. 4 is a bottom front perspective view of the dry fog diffuser of FIG. 2.
Figure 3:
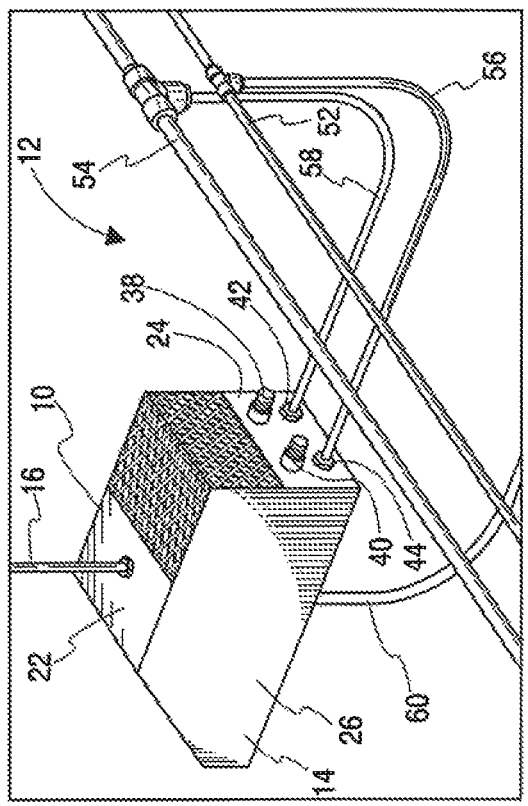
FIG. 3 is a top rear perspective of the dry fog diffuser of FIG. 2.

FIGS. 2-4 illustrate the diffuser 10 in greater detail. The housing 14 comprises a bottom wall 20 and a top wall 22. The top wall 22 is shorter than the bottom wall 20. A rear wall 24 is connected between the bottom wall 20 and top wall 22 as are opposite side walls 26, of which only one is illustrated. A front wall 28 is shorter than the rear wall 24. An angled wall 30 extends between the front wall 28 and the top wall 22 and includes a central opening 32. In the illustrated embodiment, the angled wall 30 is at a 45-degree angle relative to the top wall 22 and likewise the front wall 28. The outlet end 34 of a shroud 36 extends through the opening 32 for dispensing a dry fog F, see FIG. 1.

The hanger 16 is secured to the top wall 22. The rear half of the top wall 22 and the top half of the rear wall 24 are formed of a mesh material to allow for entry of ambient air. Mounted to the rear wall 24 are an air regulator 38, a water regulator 40, an air inlet adapter 42, and a water inlet adapter 44. A drain port 46 extends through an opening in the bottom wall 20. A water gauge 48 and air gauge 50 are also mounted to the bottom wall.

The humidification system 12 includes a water header 52 and an air header 54. A water line 56 is connected between the water header 52 and the water inlet adapter 44. A hose 58 is connected between the air header 54 and the air inlet adapter 42. A drain line 60 is connected to the drain port 46 and extends to a drain (not shown).

Referring to FIG. 5, the shroud 36 is illustrated. The shroud 36 comprises a 90-degree tubular elbow 70 formed by two 45-degree elbows 72 and 74 secured together. The elbow 70 includes an inlet end 76 and the outlet end 34. The drain port 46 is connected on the lower or long side of the elbow 70 so that when the shroud 36 is positioned in the housing 14, the drain port 46 extends downwardly through the opening (not shown) in the bottom wall 20.

In the illustrated embodiment, the elbow 70 is formed using standard PVC pipe fittings. A schedule 80 pipe is used as the wall is of sufficient thickness to provide ready securement of the drain port 46. A 4-inch diameter elbow has been found to be satisfactory although the elbow could be of a different diameter in the range of 1-inch to 6-inches.

An atomizing nozzle 78 is mounted at the elbow inlet end 76 using a bracket 80. A fastener 82 secures one end of the bracket 80 to the shroud inlet end 76. A second fastener 84 secures the opposite end of the bracket 80 to the nozzle 78. The nozzle 78 includes an air inlet 86 for connection to an air line 88 and a water inlet 90 for connection to a water line 92. The water line 92 is connected to water inlet adapter 44, see FIG. 8. Likewise, the air line 88 is connected to the air inlet adapter 42.

The nozzle 78 is illustrated in FIG. 6 and in an exploded view in FIG. 7. The nozzle 78 includes a cylindrical nozzle body 94 having an axial through opening 95. A nozzle tip 96 is mounted to an exit end of the nozzle body 94 with an O-ring 98 therebetween for sealing. The water inlet 90 is received in a top opening 100 in the nozzle body 94. The top opening 100 communicates with the through opening 95. The nozzle body 94 receives an inner sleeve 102 at the end opposite the nozzle tip 96. The inner sleeve has an end wall 106 with a 0.094 orifice 108. in the illustrated embodiment. A small inner sleeve O ring 104 seals the inner sleeve 102 in the nozzle body 94 surrounding the orifice 108. A large inner sleeve O-ring 110 seals the inner sleeve 102 relative to the inside of the nozzle body 94. The air inlet 86 is in turn secured to the inner sleeve 102.

The nozzle 78 is an atomizing nozzle which is operable to mix water and pressurized air to provide an atomized mist. As shown in FIG. 5, the nozzle 78 is aligned with an axis of the elbow 70 at the inlet end 76. The nozzle 78 may be co-axial or in parallel with the axis. As such, the nozzle 78 is not directed at the outlet end 34, but rather at the inside wall of the elbow 70. Therefore, the atomized mist exiting the tip 96 is dispersed within the shroud 36 and larger particles may fall by gravity or collect on the inner surface of the shroud 36 and exit the drain port 46. Only the smaller particles exit the outer end 34.

The water gauge 48 and water regulator 40 are connected to the water line 92, se FIG. 8. The air regulator 38 and the air gauge 50 are connected to the air line 88.

Referring to FIG. 8, the humidification system is illustrated in greater detail in a system including three diffusers 10, 10' and 10". As will be apparent, the system can use any number of diffusers, as desired. A controllable water valve 120 is connected between a water supply 122 and the water header 52. The water supply 122 may comprise a conventional utility supply providing low inlet water pressure of about 5 PSI. No additional water pumps are required. A compressor and control block 124 is connected to the air header 54. The compressor generates a relatively low air pressure of about 35 PSIG. The block 124 implements a control function for controlling the compressor and the water valve 120. The control uses a humidity sensor 126 and a desired humidity block 128. The control function may be configured as desired, such as to turn on the compressor and open the water valve 120 if the sensed humidity is below desired humidity and likewise, turn off the compressor and close the water valve 120 when sensed humidity is greater than the desired humidity.

Using the indicated air and water pressures, the diffuser 10 produces a dry fog F with particle sizes as low as 2 microns and averaging about 10 microns. The diffuser 10 produces a relatively large amount of fog given the air volume, air pressure, and water pressure. The diffuser 10 produces approximately 1 gallon of water vapor per hour. The shroud 36 is of inexpensive design and is adapted to knock down the larger sized particles, allow for ambient air to be amplified in via the inner end 76 and produces a relatively homogenous dry fog particle size distribution.

In the illustrated embodiment the shroud 36 provides enhanced volumetric amount of dry fog. The nozzle 78 is operated at 35 PSIG and 2.5 cfm at the air inlet 86. Allowing gas to expand to atmospheric pressure would account for 5.95 cfm. However, it has been found that the described shroud 36 produces volumetric air flow of about 14 cfm at the shroud outlet end 34. This enhanced volumetric flow is due to entrained air at the shroud inlet end 76. This requires a non-occlusive open space at the shroud inlet end 76 provided by the larger diameter at the opening and positioning the nozzle 78 with its tip 96 proximate the inlet end 76. Also, the mesh housing provides unrestricted ambient air flow. Advantageously, the nozzle 78 should be positioned so that at least 2 to 5 times the nozzle volume is capable of being entrained.

FIG. 9 illustrates an alternative shroud 36' in the form of a straight tube 70'. The dimensions of the tube 70' may be similar to those of the tubular elbow 70, discussed above, and is described with similar numerals with a prime symbol added. The tube 70' is mounted at a diagonal with a drain 46' at a lower side of an inlet end 76'. The drain 46' is shown connected to the drain line 60. The nozzle 78 is mounted at the inlet end 76' but is angularly offset from an axis of the tube 70'. As such, the nozzle 78 is not directed at the outlet end 34', but rather at the inside wall of the tube 70'. Therefore, the atomized mist exiting the nozzle 78 is dispersed within the shroud 36' and larger particles may fall by gravity or collect on the inner surface of the tube 70' and exit the drain port 46'. Only the smaller particles exit the outer end 34'.

Thus, as described, a humidification system uses one or more diffusers each producing a dry fog using a relatively inexpensive construction.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. Other embodiments may be within the scope of the following claims.

The invention claimed is:

1. A dry fog humidification system comprising:
 a controllable water valve connected between a water supply and a water header;
 a compressor selectively supplying a pressurized air supply to an air header;
 a control selectively operating the compressor and the water valve;
 a plurality of diffusers, each diffuser comprising a housing, a shroud mounted in the housing, the shroud comprising a tube having an open inlet end open to atmospheric air and an outlet end, the shroud mounted with a lower side of the tube including a drain port facing downward and extending through an opening in a bottom wall of the housing, and an air atomizing nozzle mounted at the open inlet end of the tube and aligned with an axis of the tube at the inlet end providing a space between the air atomizing nozzle and the tube at the open inlet end, the air atomizing nozzle connected via a water inlet adapter to the water header and via an air inlet adapter to the air header, whereby, when the air atomizing nozzle is operating, atmospheric air is drawn into the tube at the open inlet end in the space around the air atomizing nozzle so that air volume from the outlet end is about at least two times air volume from the pressurized air supply and each diffuser produces a dry fog exiting the shroud at the outlet end of the tube.

2. The dry fog humidification system of claim 1 wherein the outlet end is at about a 45 degree angle relative to a horizontal plane.

3. The dry fog humidification system of claim 1 wherein the tube comprises a straight tube.

4. The dry fog humidification system of claim 1 wherein the tube comprises a 90-degree elbow.

5. The dry fog humidification system of claim 4 wherein the tubular elbow comprises two 45-degree elbows connected together.

6. The dry fog humidification system of claim 1 wherein an air pressure regulator and pressure gauge are mounted in the housing and operatively connected between the air atomizing nozzle and an air inlet adapter for connection to the pressurized air supply.

7. The dry fog humidification system of claim 1 wherein a water pressure regulator and pressure gauge are mounted in the housing and operatively connected between the air atomizing nozzle and a water inlet adapter for connection to the water supply.

8. The dry fog humidification system of claim 1 wherein an air pressure regulator and air pressure gauge are mounted in the housing and operatively connected between the air atomizing nozzle and the air inlet adapter, and a water pressure regulator and water pressure gauge are mounted in the housing and operatively connected between the air atomizing nozzle and the water inlet adapter.

9. The dry fog humidification system of claim 1 wherein the water supply supplies water at about 5 psi.

10. The dry fog humidification system of claim 1 wherein the tube has a diameter in a range of one to six inches.

11. The dry fog humidification system of claim 10 wherein the tube has a diameter of about four inches.

12. The dry fog humidification system of claim 1 wherein each diffuser generates a dry fog having a particle size averaging about 10 microns.

13. The dry fog humidification system of claim 1 wherein the air atomizing nozzle is aligned parallel with the axis of the tube at the open inlet end.

* * * * *